No. 768,593. PATENTED AUG. 30, 1904.
W. L. R. EMMET & O. JUNGGREN.
TURBINE GENERATOR.
APPLICATION FILED MAR. 24, 1903.
NO MODEL. 4 SHEETS—SHEET 1.

WITNESSES:

INVENTORS
William L. R. Emmet,
Oscar Junggren,
by Albert G. Davis
Atty.

No. 768,593. PATENTED AUG. 30, 1904.
W. L. R. EMMET & O. JUNGGREN.
TURBINE GENERATOR.
APPLICATION FILED MAR. 24, 1903.
NO MODEL. 4 SHEETS—SHEET 2.

WITNESSES:
INVENTORS:
William L. R. Emmet,
Oscar Junggren,
by Albert G. Davis
Atty.

No. 768,593. PATENTED AUG. 30, 1904.
W. L. R. EMMET & O. JUNGGREN.
TURBINE GENERATOR.
APPLICATION FILED MAR. 24, 1903.
NO MODEL. 4 SHEETS—SHEET 3.

WITNESSES:
Robt. C. C. Chapman
Alex D. Macdonald

INVENTORS:
William L. R. Emmet,
Oscar Junggren,
by Albert H. Davis
Atty.

No. 768,593. PATENTED AUG. 30, 1904.
W. L. R. EMMET & O. JUNGGREN.
TURBINE GENERATOR.
APPLICATION FILED MAR. 24, 1903.
NO MODEL. 4 SHEETS—SHEET 4.

WITNESSES:
INVENTORS:
William L R Emmet,
Oscar Junggren,
by ATT'Y.

No. 768,593.

Patented August 30, 1904.

UNITED STATES PATENT OFFICE.

WILLIAM L. R. EMMET AND OSCAR JUNGGREN, OF SCHENECTADY, NEW YORK, ASSIGNORS TO GENERAL ELECTRIC COMPANY, A CORPORATION OF NEW YORK.

TURBINE-GENERATOR.

SPECIFICATION forming part of Letters Patent No. 768,593, dated August 30, 1904.

Application filed March 24, 1903. Serial No. 149,281. (No model.)

*To all whom it may concern:*

Be it known that we, WILLIAM L. R. EMMET and OSCAR JUNGGREN, citizens of the United States, residing at Schenectady, in the county of Schenectady, State of New York, have invented certain new and useful Improvements in Turbine-Generators, of which the following is a specification.

The object of the present invention is to provide a compact turbine-generator which is suitable for small isolated plants—such, for example, as may be used for train-lighting service.

For a consideration of what we believe to be novel and our invention attention is called to the accompanying description and claims appended thereto.

Figure 1:
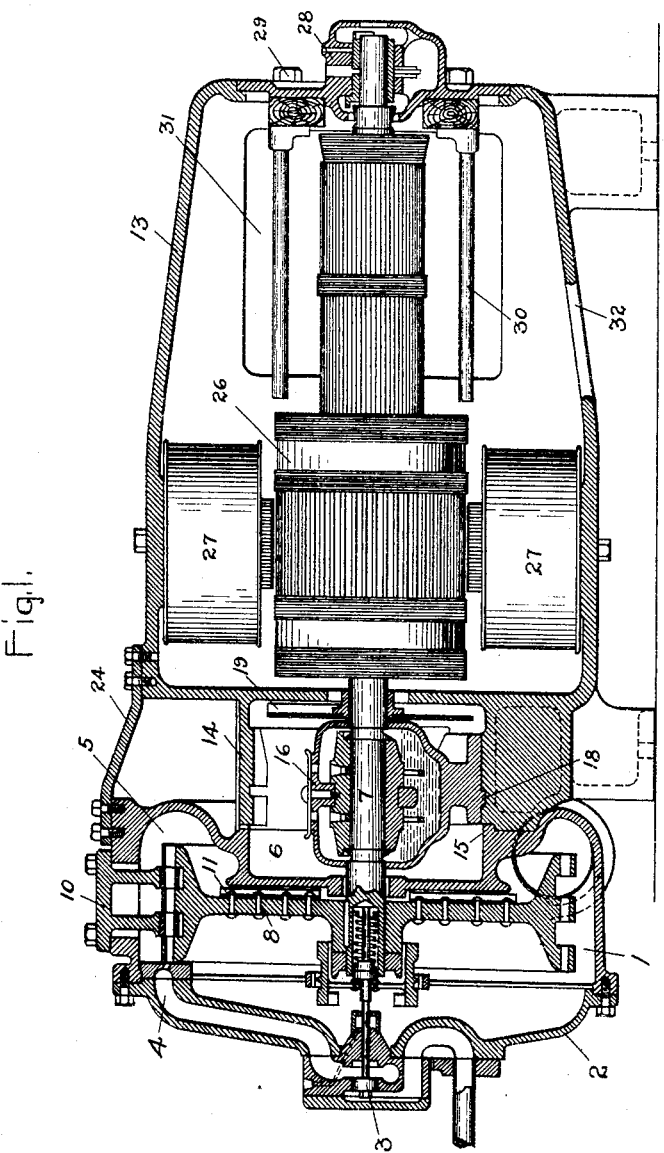
Figure 2:
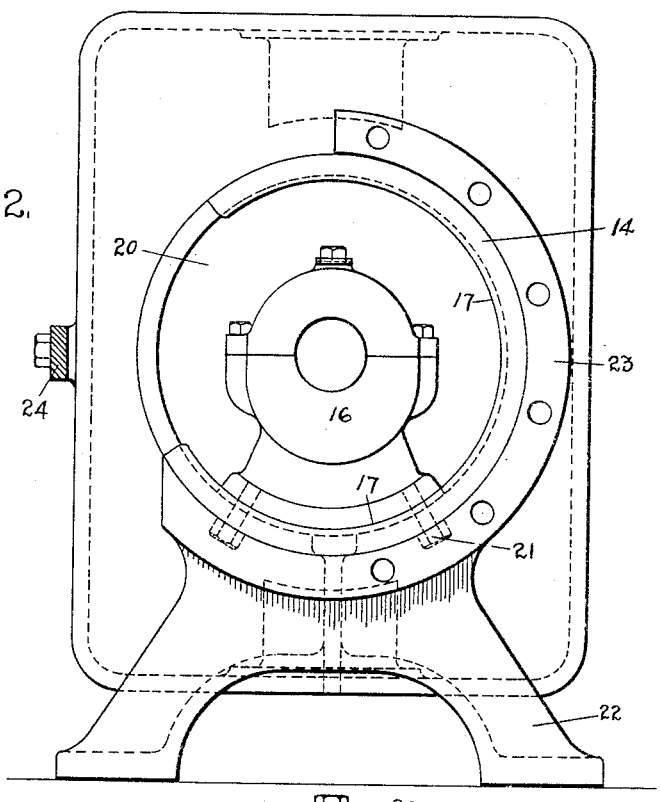
Figure 3:
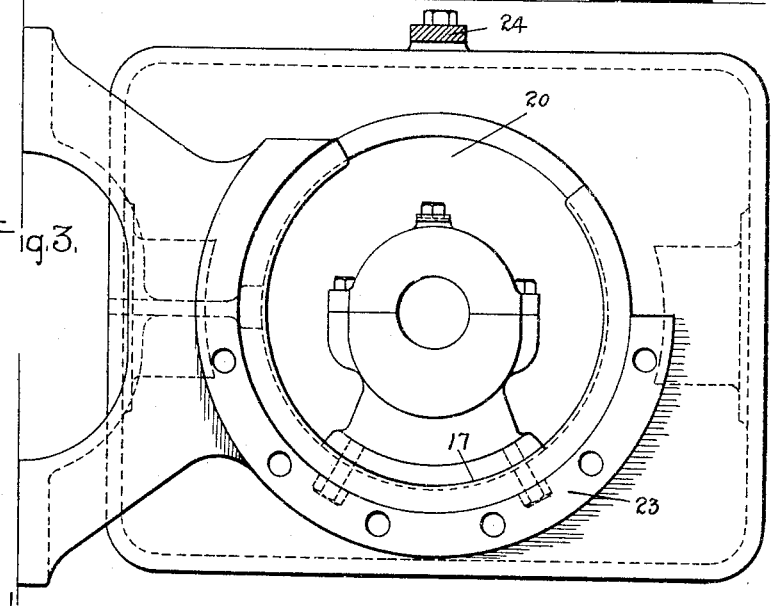
Figure 4:
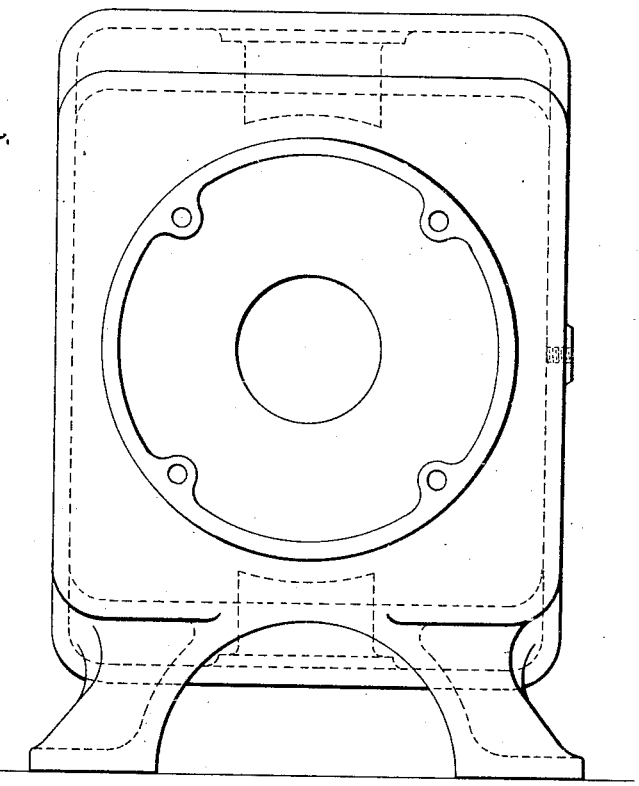
Figure 5:
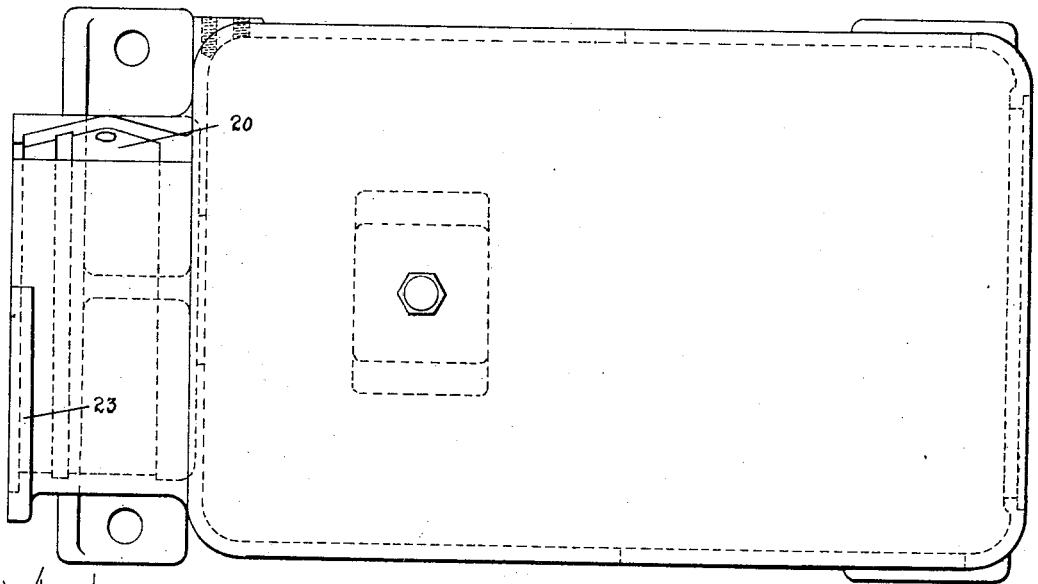
Figure 6:
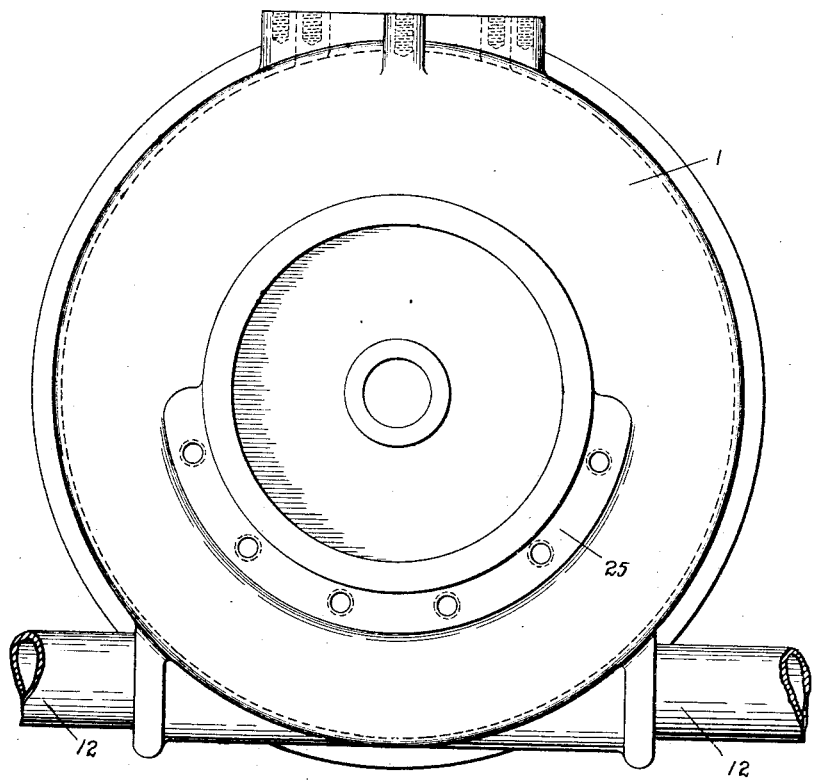

In the accompanying drawings, which illustrate an embodiment of our invention, Figure 1 is a longitudinal section of a turbine-generator lighting set. Fig. 2 is a front elevation of the generator-casing as viewed from the turbine end. Fig. 3 is a similar view showing the casing rotated through ninety degrees for the purpose of attaching it to a wall which occupies a vertical position. Fig. 4 is an end elevation of the generator-casing as viewed from the commutator end. Fig. 5 is a plan view of the generator-casing, and Fig. 6 is a side elevation of the turbine-casing as viewed from the generator end.

In carrying out our invention the turbine and generator are made as simple and compact as possible and are combined by novel means whereby they may be supported on the floor, side wall, or ceiling or other support, at the same time preserving the proper relation of the oil-wells and other parts.

1 represents a turbine-casing having a detachable cover 2, in which is located a throttle-valve 3 for controlling the admission of steam or other elastic fluid to the expanding nozzle 4. The character of the nozzle can, however, be changed to suit the requirements. The opposite side of the casing is provided with a cylindrical exhaust-chamber 5 and a recess 6, into which extends the main bearing of the machine. It will be noted that the vertical wall of the recess is situated in close proximity to the wheel. The object of this is to reduce the size of the exhaust-chamber and also to give room for the reception of the bearing. By this means the machine as a whole can be made very compact in its longitudinal dimension.

Mounted on the main shaft 7 is a bucket-wheel 8, having a number of rows of peripheral buckets for fractionally abstracting the velocity of the fluid-stream. In the present instance three of these rows are shown; but the number can be varied. Between the rows of wheel-buckets are stationary intermediate buckets arranged in segmental form and carried by the support 10, the latter being detachable from the outside of the casing.

In order to prevent the steam or other elastic fluid from leaking out around the shaft 7, the wheel is provided with a plurality of radially-extending vanes 11, which create a small difference in pressure between their inner and outer ends. To state the matter differently, there is a pressure within the shell which is slightly above atmosphere. Hence there is a tendency for the exhaust to escape around the shaft. To obviate this, a means is provided which creates such a pressure as will balance or substantially balance that of the shell. By this means we are able to obviate the use of a packing and the troubles incident thereto. The exhaust-chamber is provided with one or more discharge-pipes 12, as shown in Fig. 6.

The generator is provided with a casing 13, having a projection or neck 14 formed integral therewith and engaging with the wall of the turbine-casing adjacent to the recess 6. Between the projection or neck and the turbine-casing is a shoulder 15, which assists in preserving the alinement between the turbine and the generator. The inner wall or surface of this projection or neck is cylindrical and finished as shown in Figs. 1, 2, and 3, and mounted thereon is an adjustable bearing 16 for the main shaft. It will be noted that only two bearings are provided for the machine and that the bucket-wheel is overhung.

The bearing 16 is provided with a base, having a cylindrical surface 17, engaging with the curved surface on the neck or projection. Between the bearing and the projection is a tongue and groove 18 to prevent the bearing from moving longitudinally on the neck. The bearing is wholly supported by the neck or projection; but a portion of it extends into the recess formed in the turbine-casing.

Mounted on the shaft and adjacent to the vertical wall of the generator-casing is a plurality of radially-extending fan-blades 19, which suck air from within the casing and discharge it outwardly through the opening 20, formed in the neck and best shown in Figs. 2, 3, and 5. In this manner the generator is kept cool, and by placing a fan between the turbine and generator the transmission of heat from the former to the latter is to a very large extent obviated. The bearing is secured in place by bolts 21 and may be adjusted so that the oil-well shown in Fig. 1 will always be at the bottom, whether the supporting-feet 22 occupy the positions shown in Figs. 2 or 3 or are attached to the ceiling or similar support. This means that it is necessary to space the bolt-holes equidistant and have them arranged in sets ninety degrees apart. The neck or projection 14 is provided with an outwardly-turned flange 23, as best shown in Figs. 2, 3, and 5. This flange is provided with a plurality of bolt-holes which are spaced equidistant, and these holes register with corresponding holes formed in the casing of the turbine. By providing the outturned flange on the neck the bolts are accessible from the outside of the machine, so that it is a simple matter to rotate the turbine and generator casings with respect to each other when it becomes necessary to change their relation for use in a particular position. It also simplifies matters in case it is desired to separate the casings.

In order to stiffen the connection between the two casings, one or more stay-rods 24, Fig. 1, are provided. It will usually be found sufficient to provide one of these stay-rods and to locate it on the side opposite the opening 20 in the neck.

Referring to Fig. 6 it will be seen that the turbine-casing 1 is provided with a finished surface 25, containing a plurality of equally-spaced bolt-holes, which holes register with those formed in the outturned flange 23 on the projection on the neck.

Mounted on the shaft 7 and within the generator-casing is an armature 26 of suitable construction which is acted upon by two or more magnets 27. The commutator end of the shaft is provided with a bearing 28, having a suitable oil-well. This bearing is secured in place by bolts 29, which are spaced equidistant. In the present illustration, Fig. 4, four of these bolt-holes are shown, which are displaced by ninety degrees. When it is desired to mount the turbine-casing at a different angle with respect to the casing, it is necessary to correspondingly adjust the bearings 16 and 28, so that the oil-well may be in the proper position. In the present illustration no commutator-brushes are shown, although the supports 30 therefor are shown and are carried by the head which supports the bearing.

The generator-casing is provided with two openings 31 and 32. The former is normally covered when the machine is in operation and is intended to facilitate inspection and adjustment of the brushes. The latter is commonly open when the machine is in operation and acts as a ventilating-hole, so that an air circulation can be produced by the fan 19. The latter, in addition to creating a circulation in the generator-casing, also tends to cool the bearing 16 by discharging a current of relatively cool air over it.

In accordance with the provisions of the patent statutes we have described the principle of operation of our invention, together with the apparatus which we now consider to represent the best embodiment thereof; but we desire to have it understood that the apparatus shown is only illustrative and that the invention can be carried out by other means.

What we claim as new, and desire to secure by Letters Patent of the United States, is—

1. In a turbine-generator set, the combination of a turbine-casing, a bucket-wheel inclosed thereby, a generator-casing, an armature inclosed thereby, a projection or neck between the casings for uniting them, and a shaft-bearing carried by said projection or neck.

2. In a turbine-generator set, the combination of a turbine-casing, a generator-casing, a projection or neck attached to one of the casings and provided with a flange which is bolted to the other casing, an adjustable bearing carried by the projection, and bolts entering holes spaced equidistant for securing the bearing in place.

3. In a turbine-generator set, the combination of a turbine-casing having a recess in one side, a generator-casing having a projection formed thereon which is adjustably secured to the turbine-casing and is provided with a cylindrical inner surface, the recess and projection registering, and a bearing which is mounted on said cylindrical surface and extends into said recess.

4. In a turbine-generator set, the combination of a turbine-casing, a generator-casing, a projection or neck attached to one of the casings for uniting them having bolt-holes spaced equidistant which coincide with similarly-arranged holes in the other casing whereby the two casings may be angularly adjusted with respect to each other, retaining-bolts, and an adjustable shaft-bearing.

5. In a turbine-generator set, the combination of a turbine-casing having a recess formed therein, a generator-casing having a projection thereon which registers with said recess, feet for supporting the set which are attached to the generator-casing, and an adjustable shaft-bearing which is situated between the casings and within the recess and projection.

6. In a turbine, the combination of a bucket-wheel, a nozzle, a shaft for the wheel, a casing which incloses the wheel and is separated from the shaft by a small clearance, an exhaust-opening for the casing, and a fan for preventing the exhaust from escaping around the shaft.

7. In a turbine-generator set, the combination of a turbine-casing, a generator-casing, a shaft for the turbine and generator which is separated from both by clearances, a neck which connects the casings, a bearing located in the neck, and a fan for preventing the exhaust in the turbine-casing from entering the neck.

8. In a turbine-generator set, the combination of a turbine-casing, a wheel, a generator-casing, a neck for uniting the casings which is provided with an opening, a main shaft, a fan which receives air from the generator-casing and discharges it through said opening, and a second fan located within the turbine-casing which creates a difference in pressure between the shaft-opening and the wheel periphery and prevents the escape of the exhaust.

9. In a turbine-generator set, the combination of a turbine-casing, a generator-casing, a neck for uniting the casings which is provided with an opening and a cylindrical surface, a bearing which engages said surface, and means whereby the bearing is adjustably secured thereto.

10. In a turbine-generator set, the combination of a generator, a shaft on which the movable element of the generator is mounted, bearings for the shaft, which are angularly adjustable to permit the apparatus as a whole to be mounted in different angular positions, and a turbine-wheel mounted on one end of the shaft beyond the bearing.

11. In a turbine-generator set, the combination of a generator, a shaft on which the movable element of the generator is mounted, bearings for the shaft, which are supported by the generator and are angularly adjustable, means for securing the bearing in any predetermined position, an overhung turbine-wheel mounted on the end of the shaft, and a casing therefor.

12. In an elastic-fluid turbine, the combination of a casing, a nozzle for delivering the motive fluid in the form of a jet, a bucket-wheel, a shaft therefor, and a means for generating a pressure opposing that of the casing to prevent the escape of exhaust around the shaft.

13. In an elastic-fluid turbine, the combination of casing, a nozzle for delivering motive fluid in the form of a jet, a wheel having peripheral buckets, intermediate buckets between the wheel-buckets, a shaft, and a means for generating a pressure opposing that of the exhaust to reduce the leakage.

14. In an elastic-fluid turbine, the combination of a casing, a wheel mounted therein, a shaft carrying the wheel, and a means generating pressure by the motion of the shaft for preventing the exhaust from escaping through a clearance around the shaft.

In witness whereof we have hereunto set our hands this 23d day of March, 1903.

WILLIAM L. R. EMMET.
OSCAR JUNGGREN.

Witnesses:
BENJAMIN B. HULL,
HELEN ORFORD.